Patented Dec. 27, 1949

2,492,844

UNITED STATES PATENT OFFICE 2,492,844

DECOMPOSITION OF POLYMERIC MATERIAL

Francis E. Condon, Bartlesville, Okla., assignor to Phillips Petroleum Company, a corporation of Delaware No Drawing. Application November 1, 1948, Serial No. 57,829

3 Claims. (Cl. 260—676)

This invention relates to polymeric olefins. In one aspect this invention relates to decomposition of polymeric iso-olefins. In another aspect this invention relates to a process wherein poly isoolefins are decomposed to form light olefin and paraffin hydrocarbons.

An object of this invention is to provide a process for the decomposition of polymeric materials.

Another object is to provide a process for the catalytic decomposition of a polymeric iso-olefin to paraffin hydrocarbons.

Another object is to provide a process for the decomposition of isobutylene polymer to monomeric butenes, and isobutane.

Other objects will be apparent, to those skilled in the art, from the accompanying discussion and disclosure.

In accordance with my invention, polymeric olefins having a molecular weight above 100 are decomposed to lighter olefins and paraffin hydrocarbons in the presence of iodine as a catalyst. By my process I may convert polyolefin hydrocarbons to produce paraffin hydrocarbons as a part of the product, whereas in the various depolymerization methods known in the art, a paraffin product is not obtained.

I have discovered that by heating a liquid poly iso-olefin, for example tri-isobutylene, at a temperature above 200° C., usually within a preferred range of 200 to 220° C., or sometimes higher, under a sufficient pressure to maintain liquid phase, in the presence of from 5 to 12% by weight of molecular iodine, based on the poly iso-olefin, paraffin hydrocarbons are formed together with other products. I have found that the conversion reaction of my invention may require from 1 to 6 hours, although a reaction time usually within the range of from 3 to 4 hours is preferable.

In a preferred embodiment of my invention I may decompose tri-isobutylene to produce isobutane as a product, by admixing tri-isobutylene with from 5 to 12% by weight of molecular iodine, and heating the resulting admixture at a temperature within the limits of 200 to 220° C. for a duration of from 3 to 4 hours under a pressure sufficiently high to maintain the system in liquid phase, usually from 100 to 500 p. s. i. g. The reaction mixture is then cooled, and the iodine catalyst removed, as by washing with an aqueous solution of sodium bisulfite, or by distillation. Iodine-free hydrocarbon product may then be resolved into products and any unchanged triisobutylene. Butenes and isobutane are recovered from the reaction effluents, together with any other material having a molecular weight lower than tri-isobutylene.

In another embodiment of my invention, polymeric olefins may be decomposed when in admixture with a paraffin. Reaction conditions in such a case are similar to those already discussed above for decomposition of polymeric olefins alone.

Advantages of this invention are illustrated by the following examples. The reactants and their proportions, and other specific ingredients are presented as being typical and should not be construed to limit the invention unduly.

Example 1

Seventy-five parts by weight of tri-isobutylene and 6.7 parts by weight of molecular iodine were sealed in a steel bomb and the bomb heated at 212° C. for three hours and then allowed to cool. The maximum pressure was 160 p. s. i. g. The iodine-free portion of the effluent comprised the following:

|   | Parts by weight |
|---|---|
| Propane | Trace |
| Isobutane | 2.9 |
| Isobutene | 10.7 |
| Liquid boiling to 96° C. | 9.1 |
| Liquid boiling above 96° C. | 43.3 |
| Loss of hydrocarbon | 9 |

Example 2

One hundred forty-seven parts by weight of 2-methylpentane, 25.2 parts of tri-isobutylene, and 10 parts of molecular iodine were sealed in a stainless steel bomb and heated at 200–210° C. for four hours; the pressure was 290–410 p. s. i. g. The iodine-free product had the following composition:

|   | Weight per cent |
|---|---|
| Isobutane | 2.8 |
| Isopentane | 1.25 |
| Isohexane | 84.2 |
| Residue | 11.8 |

The residue appeared to contain only about 10 per cent of unchanged tri-isobutylene, determined by titration with a bromine solution.

As will be evident to those skilled in the art, various modifications can be made or followed in the light of the foregoing discussion and disclosure, without departing from the spirit or scope of the disclosure or from the scope of the claims.

I claim:

1. A process for the conversion of a liquid polymeric iso-olefin wherein a paraffin product is formed, comprising heating such a polymeric material in admixture with from 5 to 12% by weight of molecular iodine at a temperature within the range of 200 to 220° C. for a period of from 3 to 4 hours.

2. A process for the conversion of tri-isobutylene to lower-boiling paraffin hydrocarbons, comprising admixing tri-isobutylene with from 5 to 12% by weight of molecular iodine and heating the resulting admixture in a closed system at a temperature in the range of 210 to 220° C. for a period of from 3 to 4 hours, and recovering a lower-boiling isoparaffin as product of the process.

3. A process for the decomposition of tri-isobutylene when in admixture with a paraffin hydrocarbon material, comprising heating such an admixture at a temperature within the limits of from 200 to 210° C. for a period of from 3 to 4 hours in the presence of from 5 to 12% by weight of molecular iodine based on the tri-isobutylene, and recovering paraffin and olefin hydrocarbons of lower molecular weight as products of the process.

FRANCIS E. CONDON.

REFERENCES CITED

The following references are of record in the file of this patent:

UNITED STATES PATENTS

| Number | Name | Date |
|---|---|---|
| 1,899,582 | Mark et al. | Feb. 28, 1933 |
| 1,925,421 | Van Peski | Sept. 5, 1933 |
| 2,143,050 | Berger | Jan. 10, 1939 |

OTHER REFERENCES

Berenz et al., Compt. Rend. (USSR) 24, 883 to 885.